(12) United States Patent
Joseph et al.

(10) Patent No.: US 11,976,602 B2
(45) Date of Patent: May 7, 2024

(54) REVERSIBLE TARGET FOR A 3-, 4- OR 6-CYLINDER ENGINE

(71) Applicant: VITESCO TECHNOLOGIES GMBH, Hannover (DE)

(72) Inventors: Fabien Joseph, Toulouse (FR); Stéphane Eloy, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 519 days.

(21) Appl. No.: 17/294,234

(22) PCT Filed: Nov. 15, 2019

(86) PCT No.: PCT/EP2019/081460
§ 371 (c)(1),
(2) Date: May 14, 2021

(87) PCT Pub. No.: WO2020/099625
PCT Pub. Date: May 22, 2020

(65) Prior Publication Data
US 2022/0003177 A1    Jan. 6, 2022

(30) Foreign Application Priority Data

Nov. 16, 2018 (FR) ...................... 1871563

(51) Int. Cl.
*F02D 41/00* (2006.01)
*F01L 1/047* (2006.01)
(Continued)

(52) U.S. Cl.
CPC ............ *F02D 41/009* (2013.01); *F01L 1/047* (2013.01); *G01D 5/145* (2013.01); *G01M 15/06* (2013.01);
(Continued)

(58) Field of Classification Search
CPC .. F02D 41/009; F02D 2041/001; F01L 1/047; F01L 2820/041; F01L 1/344;
(Continued)

(56) References Cited

U.S. PATENT DOCUMENTS 5,469,823 A    11/1995  Ott et al.
6,016,789 A     1/2000  Denz et al.
(Continued)

FOREIGN PATENT DOCUMENTS

CN    107209025 A    9/2017
CN    107532529 A    1/2018
(Continued)

OTHER PUBLICATIONS

Office Action issued in Japanese Patent Application No. 2021-526637 dated Sep. 13, 2023.
(Continued)

*Primary Examiner* — Steven L Yeninas
*Assistant Examiner* — Dilara Sultana
(74) *Attorney, Agent, or Firm* — NIXON & VANDERHYE

(57) ABSTRACT

Disclosed is a camshaft toothed wheel, forming a target for a camshaft position sensor, the toothed wheel including a circular body including two opposite main faces, and at least six teeth distributed over the circumference of the circular body, each tooth including two edges, one corresponding to a rising edge and the other to a falling edge, as a function of a direction of rotation of the wheel, the toothed wheel having asymmetry of revolution. The six teeth are shaped so that the toothed wheel includes, considering the same main face and the same direction of rotation of the wheel: four edges of the same first rising or falling type spaced 90° apart, respectively; and six edges of the same second falling or rising type, respectively, spaced 60° apart, respectively.

20 Claims, 6 Drawing Sheets

(51) Int. Cl.
　　　*G01D 5/14* 　　(2006.01)
　　　*G01M 15/06* 　(2006.01)
(52) U.S. Cl.
　　　CPC ... *F01L 2820/041* (2013.01); *F02D 2041/001* (2013.01); *G01D 2205/771* (2021.05)
(58) Field of Classification Search
　　　CPC .. G01D 5/145; G01D 2205/771; G01D 5/246; G01D 5/247; G01M 15/06
　　　See application file for complete search history.

(56) References Cited

U.S. PATENT DOCUMENTS

| | | |
|---|---|---|
| 6,474,278 B1 | 11/2002 | Davis et al. |
| 10,371,072 B2 | 8/2019 | Gouzenne Coutier |
| 10,634,077 B2 | 4/2020 | Mazenc |
| 11,112,277 B2 | 9/2021 | Mirassou et al. |
| 2003/0000498 A1 | 1/2003 | Mathews et al. |
| 2006/0201238 A1 | 9/2006 | Trapasso et al. |
| 2008/0210021 A1 | 9/2008 | Steinruecken et al. |
| 2014/0360254 A1 | 12/2014 | Deringer et al. |
| 2015/0114097 A1 | 4/2015 | Zouboff et al. |
| 2017/0175654 A1* | 6/2017 | Eom ................ F02P 7/0775 |
| 2019/0360410 A1 | 11/2019 | Jones |

FOREIGN PATENT DOCUMENTS

| | | |
|---|---|---|
| CN | 107849993 A | 3/2018 |
| FR | 2950393 A1 | 3/2011 |
| JP | H07507615 A | 8/1995 |
| JP | H10169497 A | 6/1998 |
| JP | 2014101845 A | 6/2014 |
| KR | 20050069053 A * | 7/2007 |

OTHER PUBLICATIONS

International Search Report for PCT/EP2019/081460 dated Feb. 14, 2020, 6 pages.

Written Opinion of the ISA for PCT/EP2019/081460 dated Feb. 14, 2020, 6 pages.

Office Action and Search Report, issued in Chinese Patent Application No. 201980089176.X dated Oct. 20, 2023.

* cited by examiner

[Fig. 2a]
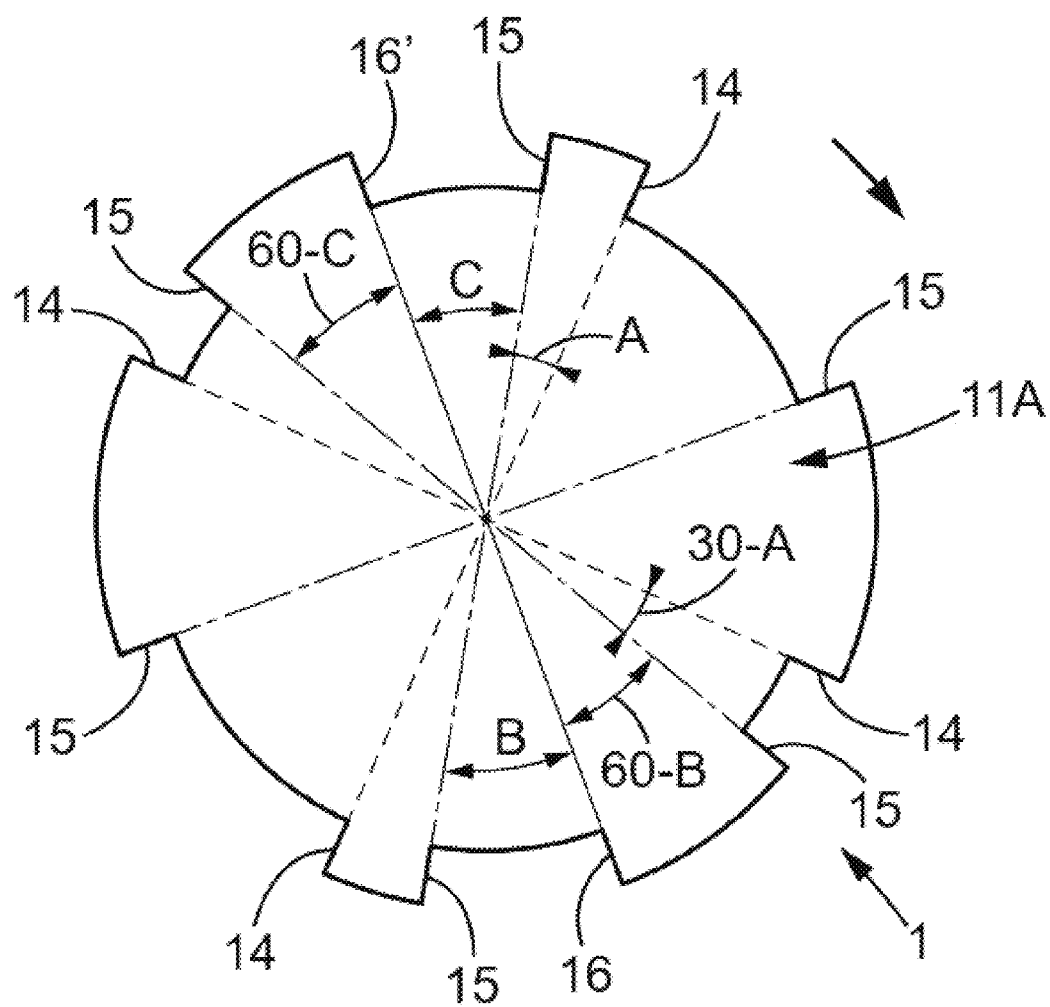

[Fig. 2b]
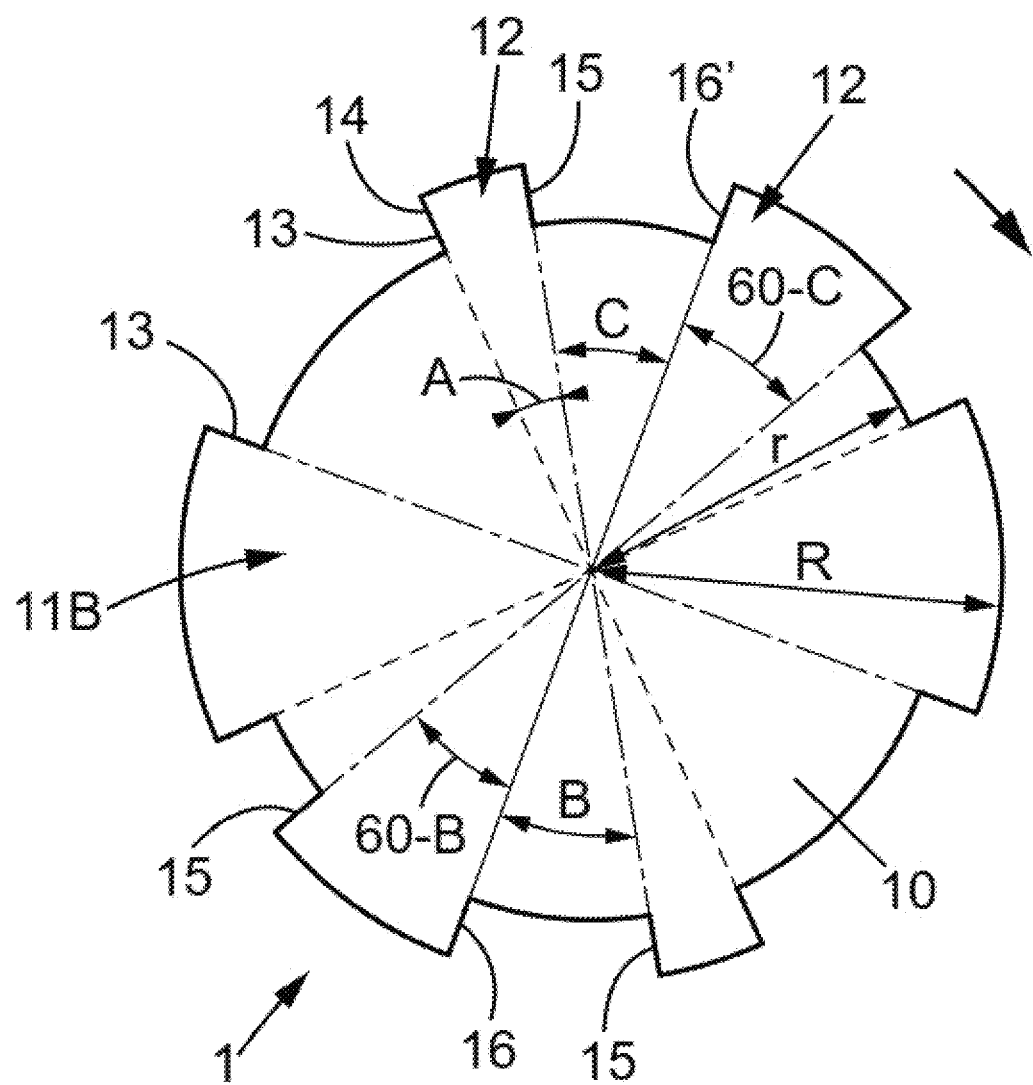

[Fig. 3a]
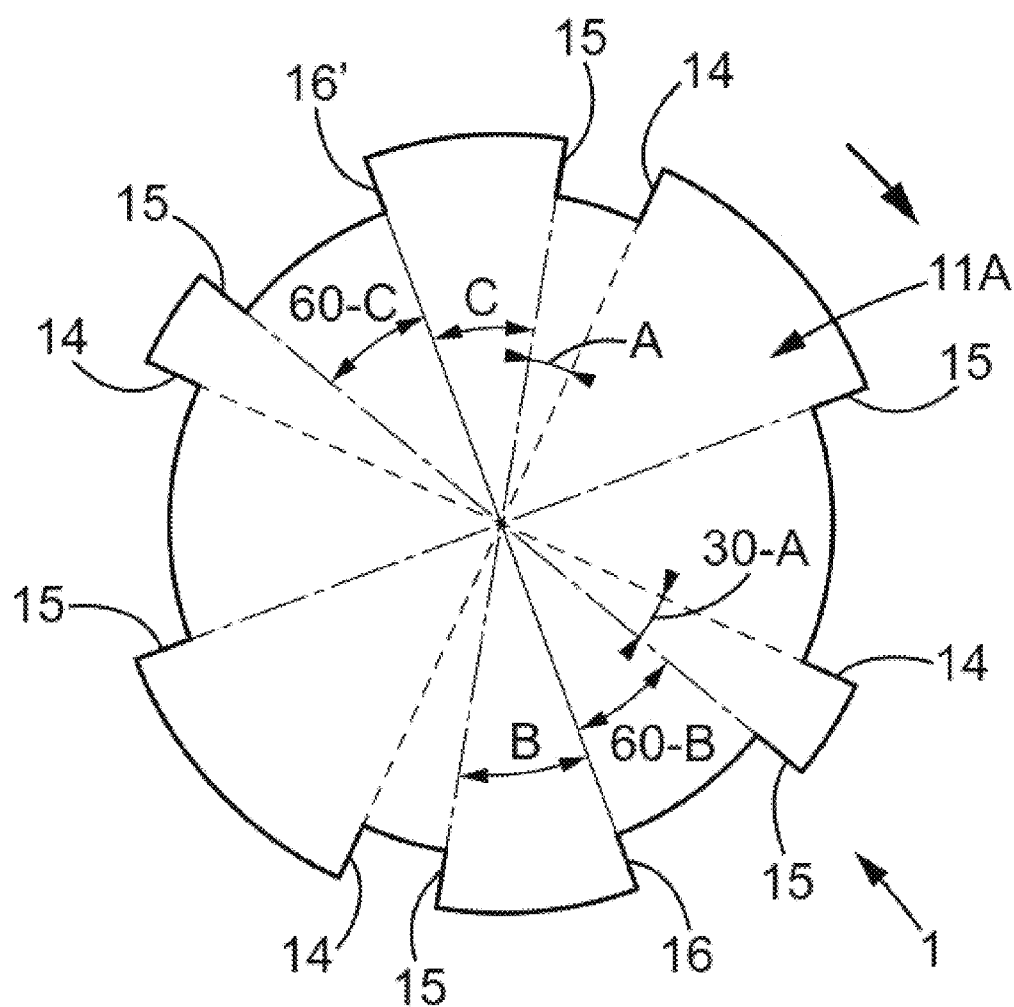

[Fig. 3b]
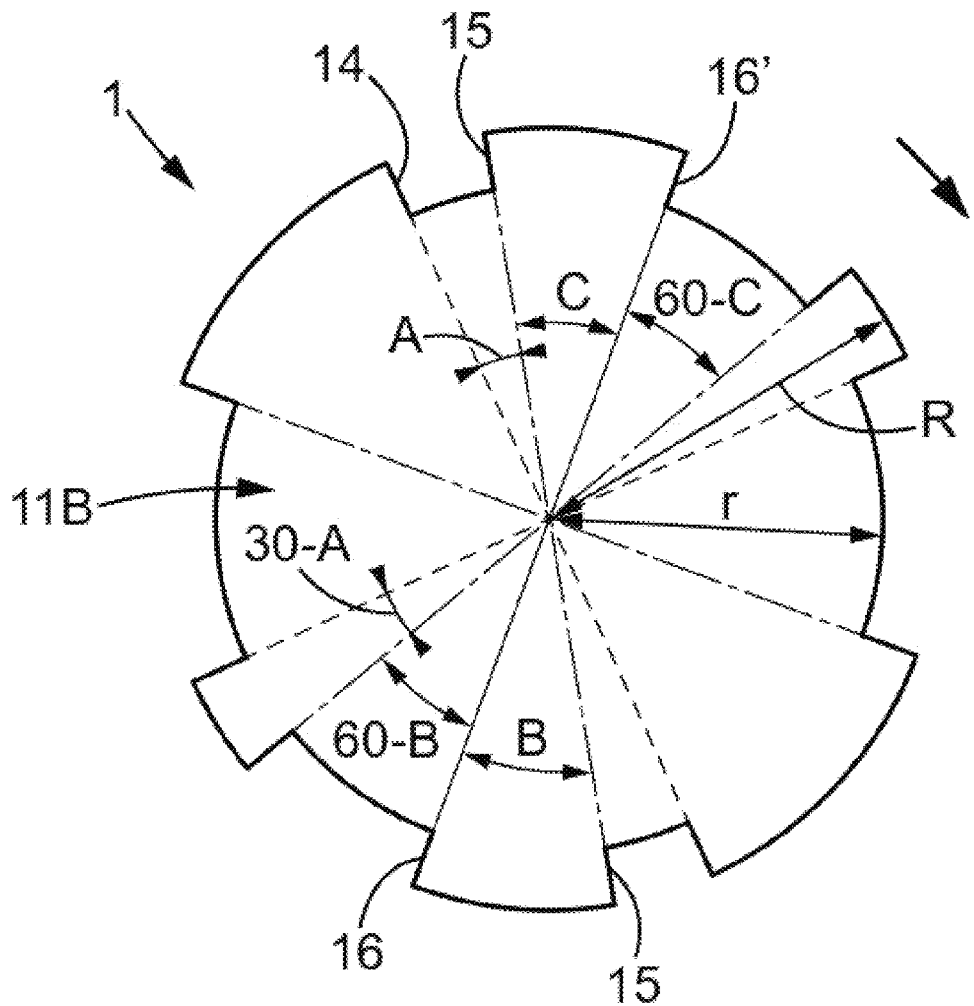
[Fig. 4]
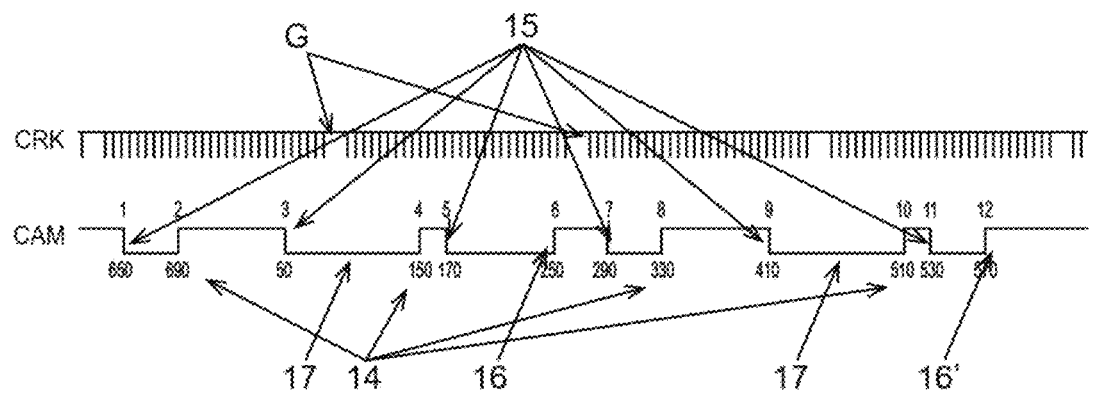

[Fig. 5]
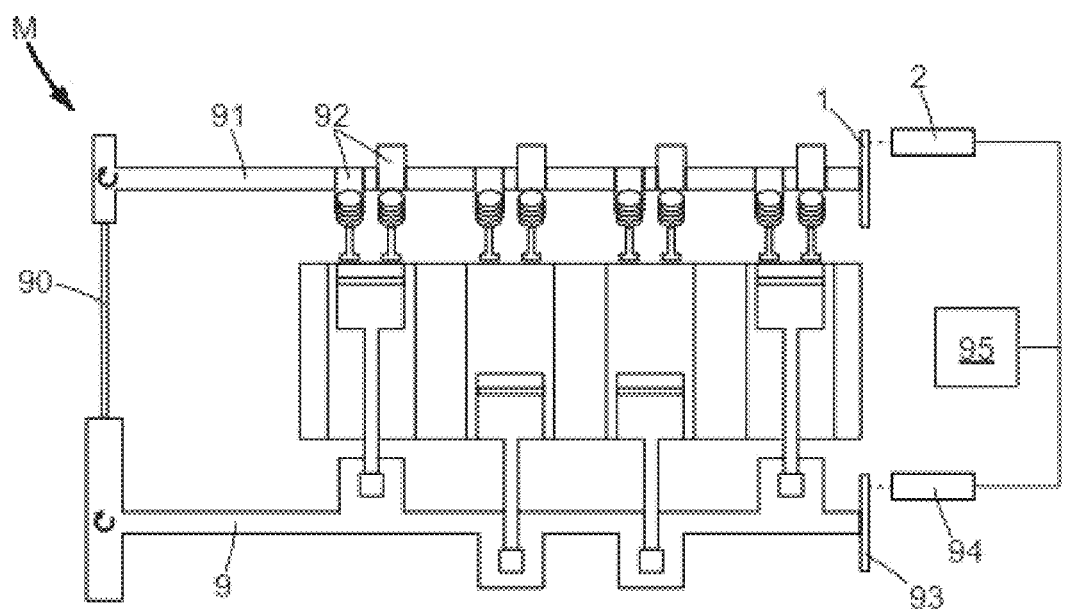

REVERSIBLE TARGET FOR A 3-, 4- OR 6-CYLINDER ENGINE

CROSS-REFERENCE TO RELATED APPLICATIONS

This application is the U.S. national phase of International Application No. PCT/EP2019/081460 filed Nov. 15, 2019 which designated the U.S. and claims priority to FR 1871563 filed Nov. 16, 2018, the entire contents of each of which are hereby incorporated by reference.

BACKGROUND OF THE INVENTION

Field of the Invention

The invention relates to a camshaft toothed wheel forming a target for a camshaft position sensor, suitable for three-, four- or six-cylinder engines. The wheel is particularly suitable for use with a position sensor of the type capable of detecting a high or low level of the toothed wheel and of detecting, from a variation in level, a type of rising or falling edge of a tooth of the wheel.

Description of the Related Art

In the operating cycle of an internal combustion engine, it is necessary to know precisely the position of the crankshaft in order to be able to synchronize various actions such as fuel injection, control of the spark plugs, management of the timing components, etc. This makes it possible to optimize combustion efficiency and to reduce fuel consumption and harmful emissions.

To this end, a crankshaft conventionally comprises a toothed wheel the teeth of which are detected by a sensor. The toothed wheel typically comprises a set of teeth distributed evenly around its circumference, with the exception of a reference portion devoid of teeth, also known as a gap. By detecting the teeth passing in front of the sensor and counting the number of teeth that have passed since the gap, it is possible to know the position of the crankshaft over a 360° revolution.

Now, one engine cycle corresponds to two complete rotations of the crankshaft, and it is therefore insufficient to determine the position of the engine solely on the basis of the crankshaft wheel.

This information is therefore combined with information about the angular position of the camshaft, which is rotated by the crankshaft, and also comprises a toothed wheel the teeth of which are detected by a corresponding sensor.

Whereas an engine cycle corresponds to two 360° rotations of the crankshaft, it corresponds only to one 360° rotation of the camshaft. As a result, the camshaft toothed wheel has rotational asymmetry that, cross-referenced with the information about the position of the crankshaft, makes it possible to deduce the state of the engine cycle accurately.

Each time the engine is started, the engine is thus synchronized when the crankshaft gap is detected, combined with the detection of the state of the camshaft wheel.

With reference to FIG. 1, in the case of an engine with variable valve timing (VVT), provision can be made to offset the angular position of the intake camshaft and/or the exhaust camshaft relative to the crankshaft to cause exhaust gas recirculation in the cylinders, in order to reduce fuel consumption and emissions.

In FIG. 1, the x axis shows the angular position of the crankshaft in degrees (an angle of rotation of the crankshaft corresponding to double the corresponding rotation of the camshaft) and the y axis shows the movement of the intake or exhaust valves in millimeters. The solid lines show the movements of the intake (curve A) and exhaust (curve B) valves controlled respectively by the intake and exhaust camshafts by default, and the dashed lines show the offset of the angular position of the camshafts (curve A' for the intake valves and B' for the exhaust valves) to allow the existence of an overlap range between the opening phases of the intake and exhaust valves.

It is important that the design of a camshaft toothed wheel takes into account this possible offset so that good synchronization with the information originating from the crankshaft toothed wheel is possible despite this potential offset.

In order to improve the synchronization and control performance of the variable valve timing, it is known practice to position teeth forming references specific to each cylinder on the camshaft toothed wheel. For example, a camshaft toothed wheel of a four-cylinder engine can have four edges each spaced 90° apart, each edge crossing the sensor corresponding to the same position of the piston in each respective cylinder.

Now, the same manufacturer uses several engines having a different number of cylinders on the various vehicles in its range. This results in a great variety of camshaft toothed wheels to manage, which increases the production cost of these wheels.

In addition, it should be noted that there are two types of camshaft position sensors, and two types of corresponding toothed wheels.

A first type, called a differential sensor, does not always make it possible to detect the first high level (corresponding to a tooth of the wheel) or the first low level (corresponding to a gap between two teeth). As a function of the initialization level of the sensor, it may detect the levels only when the first edge causing it to change state has been seen.

In this case, the targets used include a potentially large number of teeth to include at least as many teeth as there are relevant edges to be detected, all the teeth having the same reduced size (the targets are also called pin targets), in order to be able, on each tooth, to always detect a rising or falling edge (the adopted edge will be the one that causes the initialization level of the sensor to be left). In this case, the computer connected to the sensor detects a single edge per tooth, always of the same rising or falling type. The number and spacing of the teeth make it possible to make a toothed wheel specific to a three- or four-cylinder engine.

Document US2014/360254 discloses a camshaft toothed wheel which is suitable for use in conjunction with a differential sensor, and comprises at least one tooth at each of the following positions of its circumference: 0°, 60°, 90°, 120°, 180°, 240°, 270° and 300°. Each tooth comprises an edge that can be detected by a sensor.

This makes it possible to obtain a single wheel that is simultaneously compatible with four-cylinder engines (since the information corresponding to each cylinder is supplied by the 0°, 90°, 180° and 270° teeth) and with three- and six-cylinder engines (information supplied by the 0° CAM, 60° CAM, 120° CAM, 180° CAM, 240° CAM and 300° CAM teeth).

A second type of sensor, called TPO sensor, from the acronym for "True Power On", is suitable for detecting a high or low level of a toothed wheel as soon as it is initialized, which makes it possible to deduce the crossing of an edge. These sensors have great accuracy in the detection of one type of edge, generally falling edges, but lower accuracy in the detection of the other type of edge.

The targets used for this type of sensor generally include fewer teeth than the targets used for differential sensors, since the high and low levels of the toothed wheel must be sufficiently long to be able to be detected by the sensor, and in addition the rising and falling edges can be detected by the sensor. On the other hand, the teeth have variable lengths which are generally greater than the length of a tooth of a target for a differential sensor. These targets are also called "level targets".

The document described above is not suitable for use with a TPO sensor.

SUMMARY OF THE INVENTION

In light of the above, one object of the invention is to propose a camshaft toothed wheel that is compatible with engines comprising three, four or six cylinders, and that can be used with a TPO sensor capable of detecting a high or low level of a toothed wheel.

One object of the invention is also to propose a toothed wheel allowing synchronization performance that is just as good whether the engine comprises three, four or six cylinders.

Another object of the invention is to propose a camshaft toothed wheel that is compatible with a variable valve timing engine.

In this regard, one subject of the invention is a camshaft toothed wheel, forming a target for a camshaft position sensor, the toothed wheel comprising a circular body comprising two opposite main faces, and at least six teeth distributed over the circumference of the circular body, each tooth comprising two edges, one corresponding to a rising edge and the other to a falling edge, as a function of a direction of rotation of the wheel, the toothed wheel having asymmetry of revolution, characterized in that the six teeth are shaped so that the toothed wheel comprises, considering the same main face and the same direction of rotation of the wheel:

four edges of the same first rising or falling type spaced 90° apart, respectively, and six edges of the same second falling or rising type, respectively, spaced 60° apart, respectively.

Advantageously, but optionally, the toothed wheel comprises a marking element on one of the two opposite main faces.

Advantageously, but optionally, the toothed wheel comprises on its circumference at least two zones devoid of edges over an angle of at least 35°, the two zones being spaced 180° apart. For example, the toothed wheel may comprise on its circumference four zones devoid of one of the four edges spaced 90° apart and devoid of one of the six edges spaced 60° apart, the four zones being spaced 90° apart.

In one embodiment, the toothed wheel has six teeth, two teeth of which each comprise one of the six edges spaced 60° apart and an edge of the same type as the four edges spaced 90° apart, but distinct from them, called the first and second unassigned edges, respectively, and, with there being denoted by:

A the minimum angular difference between one of the four edges spaced 90° apart and one of the six edges spaced 60° apart, and by B the minimum angular difference between one of the six edges spaced 60° apart and the first unassigned edge, and by C the minimum angular difference between one of the six edges spaced 60° apart and the second unassigned edge, the angular positions of the edges of the teeth of the toothed wheel are [0, A, 60, 90+A, 120, 180–C, 180, 180+A, 240, 270+A, 300, 360–B].

Each tooth corresponds to a high level of the toothed wheel and each gap between two teeth corresponds to a low level of the toothed wheel, and the toothed wheel being adapted to form a target for a camshaft position sensor of the type capable of detecting a high or low level of the tooth and in order to deduce from a variation in level the presence of a tooth edge, and, in one case, the minimum angular difference A corresponds to a high level of the toothed wheel, and is defined by the following relationships:

$$A > \tan^{-1}\left(\frac{L_{high}}{R}\right) \text{ et } 30 - A > \tan^{-1}\left(\frac{L_{low}}{r}\right), \quad \text{[Math. 1]}$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth delimiting a gap allowing the detection of the low level between these edges by the sensor.

In this case, the angular differences B and C correspond to a low level of the toothed wheel, and are defined by the following relationships:

$$B > \tan^{-1}\left(\frac{L_{low}}{r}\right) \text{ et } 60 - B > \tan^{-1}\left(\frac{L_{high}}{R}\right), \text{ and} \quad \text{[Math. 2]}$$

$$C > \tan^{-1}\left(\frac{L_{low}}{r}\right) \text{ et } 60 - C > \tan^{-1}\left(\frac{L_{high}}{R}\right), \quad \text{[Math. 3]}$$

with C and B showing different values.

Each tooth corresponds to a high level of the toothed wheel and each gap between two teeth corresponds to a low level of the toothed wheel, the toothed wheel being adapted to form a target for a camshaft position sensor of the type capable of detecting a high or low level of the tooth and to deduce from a variation in level the presence of a tooth edge, and, in another case, the minimum angular difference A corresponds to a low level of the toothed wheel, and is defined by the following relationships:

$$A > \tan^{-1}\left(\frac{L_{low}}{r}\right) \text{ et } 30 - A > \tan^{-1}\left(\frac{L_{high}}{R}\right), \quad \text{[Math. 4]}$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth delimiting a gap allowing the detection of the low level between these edges by the sensor.

In this case, the angular differences B and C correspond to a high level of the toothed wheel, and are defined by the following relationships:

$$B > \tan^{-1}\left(\frac{L_{high}}{R}\right) \text{ et } 60 - B > \tan^{-1}\left(\frac{L_{low}}{r}\right), \text{ and} \quad \text{[Math. 5]}$$

-continued $$C > \tan^{-1}\left(\frac{L_{high}}{R}\right) \text{ et } 60 - C > \tan^{-1}\left(\frac{L_{low}}{r}\right), \quad \text{[Math. 6]}$$

with C and B showing different values.

Another subject of the invention is an internal combustion engine comprising three, four or six cylinders, comprising a camshaft, a toothed wheel according to the above description, mounted securely fixed to the camshaft, in which each tooth corresponds to a high level of the toothed wheel and each gap between two teeth corresponds to a low level of the toothed wheel, and the internal combustion engine further comprises a camshaft position sensor capable of detecting a high or low level of the tooth and of detecting a tooth edge from a variation in level, the sensor having a greater detection performance for one type of edge than for the other type of edge, the toothed wheel being mounted on the camshaft so that a main face is oriented toward the camshaft position sensor, the main face oriented toward the position sensor being chosen so that:

if the engine has three or six cylinders, the six edges spaced 60° apart are edges of the type for which the detection performance of the sensor is greater, and if the engine has four cylinders, the four edges spaced 90° apart are edges of the type for which the detection performance of the sensor is greater.

Another subject of the invention is a method for assembling an internal combustion engine, comprising a camshaft, a toothed wheel according to the above description, and a camshaft position sensor of the type capable of detecting a high or low level of the toothed wheel and of detecting a tooth edge from a variation in level, the sensor having a greater detection performance for one type of edge than for the other type of edge, the assembly method comprising mounting the toothed wheel on the camshaft so that a main face of the toothed wheel is oriented toward the camshaft position sensor, in which, if the engine has three or six cylinders, the main face oriented toward the position sensor is chosen so that the six edges spaced 60° apart are of the type for which the sensor has the best detection performance, and if the engine has four cylinders, the main face oriented toward the position sensor is the opposite face, so that the four edges spaced 90° apart are of the type for which the sensor has the best detection performance.

The toothed wheel according to the invention is compatible with six-cylinder engines, since it comprises six edges regularly spaced 60° apart. As a result, it is also compatible with three-cylinder engines, since among these six edges it comprises three edges regularly spaced 120° apart. Finally, it is compatible with four-cylinder engines because it comprises four edges regularly spaced 90° apart.

In addition, the edges spaced 60° apart are all of the same type, for example rising edge, and the edges spaced 90° apart are all of the same other type, for example falling edge, which allows the toothed wheel to exhibit equally good synchronization performance for the three types of engines, even with a camshaft position sensor exhibiting better detection for one particular type of edge, since the toothed wheel can then be positioned relative to the sensor so that the edges to be detected by the sensor (edges spaced 60° or 90° apart depending on the type of engine) correspond to the type of edge best detected by the sensor.

The constraint on the types of edges affords the advantage of having a limited number of teeth (six teeth), offering the advantage of having a reduced target size (each tooth or hollow between the teeth having to have a minimum size to be correctly detected by the sensor).

There is thus no need to design and produce different targets for three-cylinder engines, four-cylinder engines and six-cylinder engines.

In addition, the presence of two symmetrical portions devoid of teeth and of at least 35° angular range makes it possible to ensure that, even in the case of a phase shift of the camshaft for a variable valve timing engine, the edge used for VVT control is not situated in a gap zone of the crankshaft wheel. Specifically, the toothed wheel according to the invention can be used in a variable valve timing engine by positioning the portion devoid of teeth relative to the crankshaft wheel gap so that, even if the camshaft is offset, the crankshaft wheel gap always coincides with the portion devoid of teeth. With the engine position being based on the analysis of the crankshaft edges, the gap zone generates greater inaccuracy.

BRIEF DESCRIPTION OF THE DRAWINGS

Other features, details and advantages of the invention will become apparent from reading the following detailed description and from analyzing the appended drawings, in which:

FIG. 2a shows a face of an example of a camshaft toothed wheel according to one embodiment of the invention.

FIG. 2b shows the face opposite to that of FIG. 2a of the same example of a toothed wheel.

FIG. 3a shows a face of another toothed wheel geometry having the same angular edge positions as the toothed wheel of FIG. 2a and FIG. 2b, by reversing the types of edges.

FIG. 3b shows the face opposite to that of FIG. 3a of the same example of a toothed wheel.

FIG. 4 shows an example of synchronization of a toothed wheel according to FIG. 2a and FIG. 2b with a crankshaft toothed wheel.

FIG. 5 shows an example of a four-cylinder engine comprising a camshaft toothed wheel according to one embodiment of the invention.

DESCRIPTION OF THE EMBODIMENTS

Figure 1:
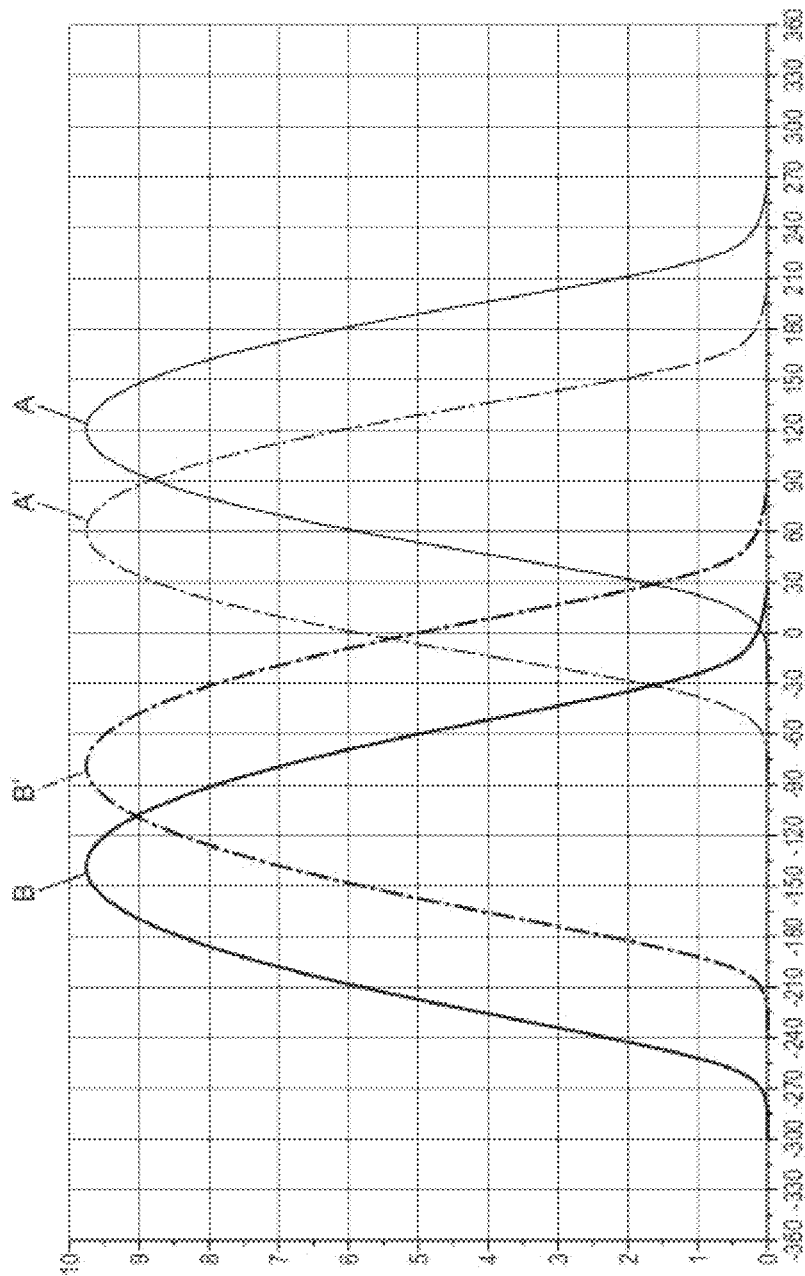
FIG. 1, already described, shows the movement of the intake and exhaust valves as a function of the angular position of the camshaft with which they are associated.

In all of what follows, angles measured in degrees on, or relating to an angular position of, a camshaft toothed wheel will be denoted in "° CAM", and angles measured in degrees on, or relating to an angular position of, a crankshaft toothed wheel will be denoted in "° CRK". A rotation of 1° CAM corresponds to a rotation of 2° CRK.

With reference to figures FIG. 2a and FIG. 2b, we will now describe a camshaft toothed wheel 1, forming a target for a camshaft angular position sensor 2.

The toothed wheel 1 is generally disk-shaped, that is to say that it comprises a circular body 10 having two opposite main faces 11A and 11B, these faces being circular, and the wheel comprises a plurality of teeth 12 at the periphery of the circular body 10. Each tooth is delimited by two edges 13 extending substantially radially and successively forming, when the wheel 1 passes in front of a sensor 2, a rising edge and a falling edge.

Whether an edge constitutes a rising edge or a falling edge depends on the side from which the toothed wheel is observed, that is to say on the main face that is observed, and on the direction of rotation of the wheel.

In figures FIG. 2a and FIG. 2b, there is shown an example of a toothed wheel 1 according to one embodiment of the invention, viewed from one side and from the opposite side, respectively, that is to say considering one and the other of the main faces 11A and 11B, and an arrow also shows the direction of rotation of the wheel that makes it possible to define a tooth edge as being a rising edge or a falling edge.

The toothed wheel 1 has alternately high and low levels, a high level corresponding to a tooth, and a low level corresponding to a gap between two consecutive teeth.

The toothed wheel is intended to be mounted so as to be constrained to rotate with a camshaft of an internal combustion engine. In order to mount it on the camshaft, a centered, circular through-hole can possibly be made in the toothed wheel.

The toothed wheel 1 is suitable for use with a TPO-type (True Power On) sensor 2, or level sensor, that is to say a sensor adapted to always be able to detect the high and low levels of the toothed wheel, and to detect a rising or falling tooth edge from a variation in level.

For example, the sensor 2 can comprise a detection cell (for example of the Hall-effect cell type, magneto-resistive cell type, etc.) suitable for detecting a high or low level of the toothed wheel, and an integrated computer suitable for detecting an edge from a variation in high or low level of the toothed wheel.

Such a sensor most often has detection performance levels—that is to say, typically, an edge detection accuracy—better for one type of edge, often falling edges, than for the other type of edge. One example of a level sensor can have an accuracy of 0.5° CAM in the detection of a falling edge and an accuracy of 1° CAM in the detection of a rising edge.

The toothed wheel 1 advantageously comprises at least six teeth, for example exactly six teeth 12, spaced apart by gaps devoid of teeth.

So that it can be used in conjunction with data obtained from a crankshaft toothed wheel, the camshaft toothed wheel 1 advantageously has asymmetry of revolution, such that the profile of the teeth of any toothed wheel half is different from that of the other half. A tooth detected by the sensor can thus be identified and the state of the engine cycle can be deduced therefrom, in conjunction with angular position data of the crankshaft.

In addition, the toothed wheel 1 is adapted to be able to be used in three-cylinder engines, four-cylinder engines and six-cylinder engines, exhibiting equally good synchronization performance for the three types of engines.

To do this, the six teeth of the toothed wheel 1 are shaped so that, when observed from the same side of the wheel that is to say by considering the same main face 11A or 11B and for the same direction of rotation of the wheel, the toothed wheel 1 has:

four edges 14 of the same first, rising or falling, type spaced 90° CAM apart, and six edges 15 of the same second, respectively falling or rising, type spaced 60° CAM apart.

The edges 14 spaced 90° CAM apart form references associated with respective cylinders of a four-cylinder engine in order to promote the control of the variable valve timing (VVT) in this type of engine, and the edges 15 spaced 60° CAM apart form references associated with the respective cylinders of a six-cylinder engine. In addition, these edges spaced 60° apart comprise three edges spaced 120° apart forming references associated with the respective cylinders of a three-cylinder engine.

In addition, the fact that the edges 15 spaced 60° CAM apart are not of the same type as the edges 14 spaced 90° CAM apart allows the same synchronization performance to be obtained for a four-cylinder engine and a three-cylinder or six-cylinder engine.

Specifically, if the position sensor 2 of the engine has better detection performance for one particular type of edge, for example falling edges, the target can be positioned by placing one main face 11 or the other facing the sensor, so that the edges of the type best detected by the sensor correspond to the edges forming the reference of the cylinders for the type of engine in question.

In other words, the target is mounted in one direction on a three- or six-cylinder engine (for example face 11B in figures FIG. 2b and FIG. 3b), and in the other direction (for example face 11A in figures FIG. 2a and FIG. 3a) on a 4-cylinder engine, assuming that the sensor is configured in the same way.

In figures FIG. 2a and FIG. 2b, there is thus shown an example of a toothed wheel 1 as viewed respectively from one side and the other, for the same direction of rotation of the wheel.

In FIG. 2a, the four edges 14 spaced 90° CAM apart are rising edges. By turning the wheel over, in FIG. 2b, the six edges 15 spaced 60° CAM apart are rising edges as well. A wheel is thus reversible.

Specifically, if the position sensor 2 has better detection accuracy for the falling edges, the target is positioned so that the main face 11B shown in FIG. 2b is facing the position sensor 2 for a four-cylinder engine (because the four edges 14 spaced 90° CAM apart are then falling edges), and the target is positioned so that the main face 111 shown in FIG. 2a is facing the position sensor 2 for a three- or six-cylinder engine (because the six edges 15 spaced 120° CAM apart are then falling edges).

To facilitate the identification of the face to be placed facing the sensor as a function of the number of cylinders of the engine, a poka-yoke can be placed on at least one of the faces 11A and 11B, that is to say a marking that makes it possible to identify the face in relation to the number of cylinders of the engine (this is because the direction of rotation is still the same, as is the type of edge best detected by a TPO-type sensor).

In one embodiment, the toothed wheel 1 has only six teeth. In this case, one edge of each tooth forms one of the edges 15 spaced 60° apart, and the opposite edge of four of the six teeth forms one of the edges 14 spaced 90° apart.

There are two unassigned tooth edges, forming a first unassigned edge 16 and a second unassigned edge 16', these edges being of the same type (rising or falling edges) as the four edges spaced 90° apart, and which do not form part of these edges, nor part of the edges spaced 60° apart. Advantageously, the angular positions of these two unassigned edges are adapted to optimize the synchronization performance of the toothed wheel, as described in more detail below.

It can be noted that two wheel geometries exist for the same arrangement of the edges, by reversing the type of edge. Thus in FIG. 2a an example has been shown in which the edges 14 spaced 90° apart are rising edges, and in FIG. 3a an example has been shown in which the edges 14 spaced 90° apart are falling edges. On the other hand, all of the angular gaps between the edges are identical.

The minimum angular difference between one of the edges spaced 90° apart and one of the edges spaced 60° apart is denoted by A. Taking into account the fact that two geometries exist for each arrangement of edges, A can correspond:
- to the angular difference between the edges of the smallest tooth of the toothed wheel, the two opposite edges of which comprise one of the edges spaced 90° apart, and one of the edges spaced 60° apart, if it corresponds to a high level of the wheel (see FIG. 2a), or
- to the angular difference between the edges delimiting the smallest gap between two consecutive teeth defined by tooth edges comprising one of the edges spaced 90° apart and one of the edges spaced 60° apart, if it corresponds to a low level of the wheel (see FIG. 3a).

Moreover, B denotes the minimum angular difference between the first unassigned edge 16 and the nearest edge among the edges spaced 60° apart. B reflects the angular position of this unassigned edge 16.

C also denotes the minimum angular difference between the second unassigned edge 16' and the nearest edge among the edges spaced 60° apart. C reflects the angular position of this second unassigned edge 16'.

As for A, the angular differences B and C can correspond to two different angular differences, depending on whether they correspond to a high or low level of the wheel, that is to say:
- to the angular difference of a gap between two teeth that is formed between the respective unassigned edge and the nearest edge among the edges spaced 60° apart, if they correspond to a low level of the wheel (see FIG. 2a), and
- to the angular difference between the edges of a tooth comprising the respective unassigned edge and the nearest edge among the edges spaced 60° apart, if they correspond to a high level of the wheel (see FIG. 3a).

If A corresponds to a high level of the wheel, then B and C both correspond to a low level of the wheel, and vice versa.

With the notations A, B and C described above, the angular positions of the edges of the teeth making it possible to obtain four edges of a first type spaced 90° CAM apart and six edges of the other type spaced 60° CAM apart comply with the following rule (in ° CAM): [0, A, 60, 90+A, 120, 180−C, 180, 180+A, 240, 270+A, 300, 360−B]

A, B and C are strictly positive and are constrained by the detection performance of the sensor.

Specifically, the sensor can detect a high level of the wheel only when this high level has a length greater than a threshold, denoted $L_{high}$. $L_{high}$ is therefore the minimum distance between the edges of a tooth allowing the detection of the high level between the edges of the tooth by the sensor.

Moreover, the sensor can detect a low level of the wheel only when this low level has a length greater than a threshold, denoted $L_{low}$. $L_{low}$ is therefore the minimum distance between the edges of two consecutive teeth delimiting a gap allowing the detection of the low level between these edges by the sensor.

By approximation, the lengths considered are those of segments connecting the high points of the edges of a tooth for $L_{high}$, and those connecting the points at the base of the edges of a gap for $L_{low}$. These segments are also considered to be substantially tangential relative to the circular body.

Therefore, when A corresponds to a high level, A must comply with the following relationships:

$$A > \tan^{-1}\left(\frac{L_{high}}{R}\right) \text{ et } 30 - A > \tan^{-1}\left(\frac{L_{low}}{r}\right), \quad \text{[Math. 1]}$$

where R is the radius of the wheel including the height of the tooth relative to the circular body 10, and r is the radius of the circular body of the wheel (see FIG. 2b).

30−A corresponds to the angular gap between the edges defining the smallest gap between two consecutive teeth delimited by edges of teeth comprising one of the edges spaced 90° apart and one of the edges spaced 60° apart. This gap must be sufficient to allow the detection of a low level, and therefore of the edges delimiting it.

In this case, B and C correspond to a low level, and more precisely to the angular opening of the gap between two teeth comprising respectively the first or the second unassigned edge, and the nearest edge among the edges spaced 60° apart. B and C must comply with the following relationships:

$$B > \tan^{-1}\left(\frac{L_{low}}{r}\right) \text{ et } 60 - B > \tan^{-1}\left(\frac{L_{high}}{R}\right), \quad \text{[Math. 2]}$$

60−B corresponds to the angle covered by the tooth comprising the first unassigned edge 16.

$$C > \tan^{-1}\left(\frac{L_{low}}{r}\right) \text{ et } 60 - C > \tan^{-1}\left(\frac{L_{high}}{R}\right), \quad \text{[Math. 3]}$$

60−C corresponds to the angle covered by the tooth comprising the second unassigned edge 16'.

In addition, to ensure that the toothed wheel has asymmetry of revolution, that is to say such that the profile of the teeth of any half of the wheel is different from that of the other half, B and C must have different values. Preferably, the difference between the values of B and C includes a tolerance greater than or equal to 5° CAM, for example equal to 10° CAM, this tolerance being associated with the detection performance of the sensor and making it possible to discriminate the mechanical positioning and manufacturing tolerances of the target.

When A corresponds to a low level (FIG. 3a and FIG. 3b), A must verify the following relationships:

$$A > \tan^{-1}\left(\frac{L_{low}}{r}\right) \text{ et } 30 - A > \tan^{-1}\left(\frac{L_{high}}{R}\right), \quad \text{[Math. 4]}$$

30−A then corresponds to the angle covered by the smallest tooth comprising one of the edges spaced 90° apart and one of the edges spaced 60° apart.

B and C then correspond to a high level, and in particular they correspond to the angle covered by the tooth comprising respectively each respective unassigned edge and the nearest edge among the edges spaced 60° apart. B and C must verify the following relationships:

$$B > \tan^{-1}\left(\frac{L_{low}}{r}\right) \text{ et } 60 - B > \tan^{-1}\left(\frac{L_{high}}{R}\right), \quad \text{[Math. 5]}$$

60−B then corresponds to the angular difference between the edges of a gap between two consecutive teeth comprising the first unassigned edge and the nearest edge among the edges spaced 60° apart.

$$C > \tan^{-1}\left(\frac{L_{low}}{r}\right) \text{ et } 60 - C > \tan^{-1}\left(\frac{L_{high}}{R}\right). \quad \text{[Math. 6]}$$

60–C then corresponds to the angular difference between the edges of a gap between two consecutive teeth comprising the second unassigned edge 16' and the nearest edge among the edges spaced 60° apart.

In addition, in this configuration also the values of B and C must be different to ensure the rotational asymmetry of the wheel, and advantageously different with a tolerance of at least 5° CAM, for example of 10° CAM, and making it possible to discriminate the mechanical positioning and manufacturing tolerances of the target.

For the toothed wheel 1 to be compatible with a variable valve timing (VVT) engine, it can advantageously comprise on the circumference of the circular body 10 at least two zones 17 devoid of edges over an angle of at least 35° CAM, for example of at least 37.5° CAM (corresponding to 75° CRK for the crankshaft), the two zones 17 being spaced 180° CAM apart. This 180° CAM spacing is counted between the median angular positions of the two zones 17. These two zones are not, however, necessarily the same size.

Specifically, during the installation of the toothed wheel on the camshaft, each portion devoid of an edge is positioned at an angular position where it is detected simultaneously with the detection of the gap of a crankshaft wheel by the corresponding sensor.

FIG. 4 compares the teeth of a crankshaft wheel (top line—CRK) comprising two gap zones G (devoid of teeth) and the teeth of a camshaft toothed wheel (bottom line—CAM, each number indicated below an arrow representing an angle of rotation value of the crankshaft in ° CRK, the angle of rotation value of the camshaft in ° CAM being equal to half of the value indicated). The toothed wheel of the camshaft is therefore positioned so that at least one gap zone G of the crankshaft corresponds to a portion devoid of edges of the toothed wheel of the camshaft.

The amplitude of 35° CAM or more of this portion makes it possible, even in the case of an angular offset of the camshaft for modifying the angular zones of opening of the intake or exhaust valves, for the zone of the toothed wheel 1 detected by the sensor 2 simultaneously with the detection of the crankshaft gap to be always devoid of an edge. The risk of an inaccurate reference associated with the detection of an edge simultaneously with the presence of the crankshaft gap is thus avoided.

The presence of the two portions spaced 180° CAM apart results from the fact that one rotation of the camshaft corresponds to two rotations of the crankshaft and therefore from the fact that the crankshaft gap corresponds to two portions of the toothed wheel spaced 180° CAM apart.

In the case where the crankshaft wheel has two gap zones spaced 180° CRK apart, the camshaft toothed wheel advantageously has four zones not comprising any of the edges 14 spaced 90° apart nor any of the edges 15 spaced 60° apart, over an angle of at least 35° CAM, said zones being spaced 90° CAM apart, these four zones advantageously including the two zones completely devoid of an edge described above.

In FIG. 4, we have also identified the six edges 15 spaced 60° CAM apart, which are in this instance falling edges, and the four edges 14 spaced 90° CAM apart, which are rising edges.

With reference to FIG. 5, there is schematically shown an example of an internal combustion engine comprising a toothed wheel according to the above description.

The engine M comprises three, four or six cylinders 82, in which respective pistons 80 slide by way of connecting rods 84 driven by a crankshaft 9. The crankshaft 9 also rotates, by means of a timing belt 90, at least one camshaft 91, the rotation of which leads to successive opening and closing of intake and exhaust valves 92.

The engine can have variable valve timing: it then comprises means (not shown) for angularly offsetting the camshaft to modify the opening times of the valves relative to an identical position of the crankshaft. The maximum offset angle is of the order of 25° CAM (or 50° CRK).

The crankshaft 9 has a toothed wheel 93 comprising a set of teeth evenly distributed around its circumference, typically 36 or 60 teeth, with the exception of one or two gap zones, typically with one or two missing teeth.

A crankshaft angular position sensor 94 is positioned facing the toothed wheel 93 and is suitable for detecting the passage of each tooth of the wheel.

A toothed wheel 1 according to the above description is mounted on the camshaft 91 or on each camshaft. A TPO-type or level sensor 2 is positioned in front of the toothed wheel and is suitable for detecting the levels of the toothed wheel and for deducing a rising or falling edge from a change in level.

As mentioned above, the sensor 2 can have greater detection performance for one type of edge than for the other type of edge.

The reversible toothed wheel is then advantageously positioned, on the camshaft, during the assembly of the engine, by orienting one of its main faces toward the sensor 2 so that:
   if the engine has three or six cylinders, the six edges spaced 60° apart correspond to the type of edge for which the sensor 2 has greater performance, and
   if the engine has four cylinders, the four edges spaced 90° apart correspond to the type of edge for which the sensor 2 has greater performance.

The engine also comprises a central processing unit 95 suitable for receiving the detection signals from the angular position sensors of the crankshaft and of the camshaft, and for deducing a state of the engine cycle therefrom at all times.

As indicated above with reference to FIG. 4, in the case where the engine is of the variable valve timing type, the camshaft toothed wheel is advantageously positioned, during the assembly of the engine, so that the range of the engine cycle during which the reference space devoid of teeth of the crankshaft toothed wheel is facing the crankshaft angular position sensor 94 is included in the range of the engine cycle during which a portion of at least 30° CAM devoid of teeth of the camshaft toothed wheel is facing the camshaft angular position sensor 2.

The invention claimed is:

1. A camshaft toothed wheel (1), forming a target for a camshaft position sensor (2), the toothed wheel comprising a circular body (10) comprising two opposite main faces (11A, 11B), and at least six teeth (12) distributed over the circumference of the circular body, each tooth comprising two edges (13), one corresponding to a rising edge and the other to a falling edge, as a function of a direction of rotation of the wheel, the toothed wheel having asymmetry of revolution, wherein the six teeth (12) are shaped so that the toothed wheel (1) comprises, considering the same main face and the same direction of rotation of the wheel:
four edges (14) of the same first rising or falling type spaced 90° apart, respectively, and
six edges (15) of the same second falling or rising type, respectively, spaced 60° apart, respectively.

2. The camshaft toothed wheel (1) as claimed in claim 1, comprising a marking element on one of the two opposite main faces.

3. The toothed wheel (1) as claimed in claim 2, comprising on the circumference at least two zones (17) devoid of edges over an angle of at least 35°, the two zones being spaced 180° apart.

4. The toothed wheel (1) as claimed in claim 2, in which two teeth (12) each comprise one of the six edges (15) spaced 60° apart and an edge (16, 16') of the same type as the four edges spaced 90° apart, but distinct from them, called the first (16) and second (16') unassigned edges, respectively, and, with there being denoted by:
A the minimum angular difference between one of the four edges (14) spaced 90° apart and one of the six edges (15) spaced 60° apart, and by
B the minimum angular difference between one of the six edges (15) spaced 60° apart and the first unassigned edge (16), and by
C the minimum angular difference between one of the six edges (15) spaced 60° apart and the second unassigned edge (16), the angular positions of the edges of the teeth of the toothed wheel are [0, A, 60, 90+A, 120, 180−C, 180, 180+A, 240, 270+A, 300, 360−B].

5. An internal combustion engine (M) comprising three, four or six cylinders, a camshaft, and a toothed wheel (1) as claimed in claim 2 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge,
the toothed wheel (1) being mounted on the camshaft so that a main face (11A, 11B) is oriented toward the camshaft position sensor (2),
the main face oriented toward the position sensor being chosen so that:
if the engine has three or six cylinders, the six edges (15) spaced 60° apart are edges of the type for which the detection performance of the sensor is greater, and
if the engine has four cylinders, the four edges (14) spaced 90° apart are edges of the type for which the detection performance of the sensor is greater.

6. The toothed wheel (1) as claimed in claim 1, comprising on the circumference at least two zones (17) devoid of edges over an angle of at least 35°, the two zones being spaced 180° apart.

7. The toothed wheel (1) as claimed in claim 6, comprising on the circumference four zones (17) devoid of one of the four edges spaced 90° apart and devoid of one of the six edges spaced 60° apart, the four zones being spaced 90° apart.

8. The toothed wheel (1) as claimed in claim 7, in which two teeth (12) each comprise one of the six edges (15) spaced 60° apart and an edge (16, 16') of the same type as the four edges spaced 90° apart, but distinct from them, called the first (16) and second (16') unassigned edges, respectively, and, with there being denoted by:
A the minimum angular difference between one of the four edges (14) spaced 90° apart and one of the six edges (15) spaced 60° apart, and by
B the minimum angular difference between one of the six edges (15) spaced 60° apart and the first unassigned edge (16), and by
C the minimum angular difference between one of the six edges (15) spaced 60° apart and the second unassigned edge (16), the angular positions of the edges of the teeth of the toothed wheel are [0, A, 60, 90+A, 120, 180−C, 180, 180+A, 240, 270+A, 300, 360−B].

9. An internal combustion engine (M) comprising three, four or six cylinders, a camshaft, and a toothed wheel (1) as claimed in claim 7 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge,
the toothed wheel (1) being mounted on the camshaft so that a main face (11A, 11B) is oriented toward the camshaft position sensor (2),
the main face oriented toward the position sensor being chosen so that:
if the engine has three or six cylinders, the six edges (15) spaced 60° apart are edges of the type for which the detection performance of the sensor is greater, and
if the engine has four cylinders, the four edges (14) spaced 90° apart are edges of the type for which the detection performance of the sensor is greater.

10. The toothed wheel (1) as claimed in claim 6, in which two teeth (12) each comprise one of the six edges (15) spaced 60° apart and an edge (16, 16') of the same type as the four edges spaced 90° apart, but distinct from them, called the first (16) and second (16') unassigned edges, respectively, and, with there being denoted by:
A the minimum angular difference between one of the four edges (14) spaced 90° apart and one of the six edges (15) spaced 60° apart, and by
B the minimum angular difference between one of the six edges (15) spaced 60° apart and the first unassigned edge (16), and by
C the minimum angular difference between one of the six edges (15) spaced 60° apart and the second unassigned edge (16), the angular positions of the edges of the teeth of the toothed wheel are [0, A, 60, 90+A, 120, 180−C, 180, 180+A, 240, 270+A, 300, 360−B].

11. An internal combustion engine (M) comprising three, four or six cylinders, a camshaft, and a toothed wheel (1) as claimed in claim 6 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge,
the toothed wheel (1) being mounted on the camshaft so that a main face (11A, 11B) is oriented toward the camshaft position sensor (2), the main face oriented toward the position sensor being chosen so that:
- if the engine has three or six cylinders, the six edges (15) spaced 60° apart are edges of the type for which the detection performance of the sensor is greater, and
- if the engine has four cylinders, the four edges (14) spaced 90° apart are edges of the type for which the detection performance of the sensor is greater.

12. The toothed wheel (1) as claimed in claim 1, in which two teeth (12) each comprise one of the six edges (15) spaced 60° apart and an edge (16, 16') of the same type as the four edges spaced 90° apart, but distinct from them, called the first (16) and second (16') unassigned edges, respectively, and, with there being denoted by:
- A the minimum angular difference between one of the four edges (14) spaced 90° apart and one of the six edges (15) spaced 60° apart, and by
- B the minimum angular difference between one of the six edges (15) spaced 60° apart and the first unassigned edge (16), and by
- C the minimum angular difference between one of the six edges (15) spaced 60° apart and the second unassigned edge (16), the angular positions of the edges of the teeth of the toothed wheel [0, A, 60, 90+A, 120, 180−C, 180, 180+A, 240, 270+A, 300, 360−B].

13. The toothed wheel as claimed in claim 12, in which each tooth (12) corresponds to a high level of the toothed wheel and each gap between two teeth corresponds to a low level of the toothed wheel, the toothed wheel being adapted to form a target for a camshaft position sensor of the type capable of detecting a high or low level of the tooth and of deducing from a variation in level the presence of a tooth edge,
and the minimum angular difference A corresponds to a high level of the toothed wheel, and is defined by the following relationships:

$$A > \tan^{-1}\left(\frac{L_{high}}{R}\right) \; et \; 30 - A > \tan^{-1}\left(\frac{L_{low}}{r}\right), \qquad \text{[Math. 1]}$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth delimiting an gap allowing the detection of the low level between these edges by the sensor.

14. The toothed wheel as claimed in claim 13, in which the angular differences B and C correspond to a low level of the toothed wheel, and are defined by the following relationships:

$$B > \tan^{-1}\left(\frac{L_{low}}{r}\right) \; et \; 60 - B > \tan^{-1}\left(\frac{L_{high}}{R}\right), \; \text{and} \qquad \text{[Math. 2]}$$

$$C > \tan^{-1}\left(\frac{L_{low}}{r}\right) \; et \; 60 - C > \tan^{-1}\left(\frac{L_{high}}{R}\right), \qquad \text{[Math. 3]}$$

with C and B showing different values.

15. An internal combustion engine (M) comprising three, four or six cylinders, a camshaft, and a toothed wheel (1) as claimed in claim 13 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge,
the toothed wheel (1) being mounted on the camshaft so that a main face (11A, 11B) is oriented toward the camshaft position sensor (2),
the main face oriented toward the position sensor being chosen so that:
- if the engine has three or six cylinders, the six edges (15) spaced 60° apart are edges of the type for which the detection performance of the sensor is greater, and
- if the engine has four cylinders, the four edges (14) spaced 90° apart are edges of the type for which the detection performance of the sensor is greater.

16. The toothed wheel as claimed in claim 12, in which each tooth (12) corresponds to a high level of the toothed wheel and each gap between two teeth corresponds to a low level of the toothed wheel, the toothed wheel being adapted to form a target for a camshaft position sensor of the type capable of detecting a high or low level of the tooth and for deducing from a variation in level the presence of a tooth edge, and the minimum angular difference A corresponds to a low level of the toothed wheel, and is defined by the following relationships:

$$A > \tan^{-1}\left(\frac{L_{low}}{r}\right) \; et \; 30 - A > \tan^{-1}\left(\frac{L_{high}}{R}\right), \qquad \text{[Math. 4]}$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth delimiting a gap allowing the detection of the low level between these edges by the sensor.

17. The toothed wheel as claimed in claim 16, in which the angular differences B and C correspond to a high level of the toothed wheel, and are defined by the following relationships:

$$B > \tan^{-1}\left(\frac{L_{high}}{R}\right) \; et \; 60 - B > \tan^{-1}\left(\frac{L_{low}}{r}\right), \; \text{and} \qquad \text{[Math. 5]}$$

$$C > \tan^{-1}\left(\frac{L_{high}}{R}\right) \; et \; 60 - C > \tan^{-1}\left(\frac{L_{low}}{r}\right), \qquad \text{[Math. 6]}$$

with C and B showing different values.

18. An internal combustion engine (M) comprising three, four or six cylinders, a camshaft, and a toothed wheel (1) as claimed in claim 12 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge,
the toothed wheel (1) being mounted on the camshaft so that a main face (11A, 11B) is oriented toward the camshaft position sensor (2), the main face oriented toward the position sensor being chosen so that:

if the engine has three or six cylinders, the six edges (15) spaced 60° apart are edges of the type for which the detection performance of the sensor is greater, and if the engine has four cylinders, the four edges (14) spaced 90° apart are edges of the type for which the detection performance of the sensor is greater.

19. An internal combustion engine (M) comprising three, four or six cylinders, a camshaft, and a toothed wheel (1) as claimed in claim 1 mounted securely fixed to the camshaft, in which each tooth (12) corresponds to a high level of the toothed wheel and each gap between two teeth corresponds to a low level of the toothed wheel, and the internal combustion engine (M) further comprises a position sensor (2) for the camshaft capable of detecting a high or low level of the tooth and of detecting a tooth edge from a variation in level, the sensor having a higher detection performance for one type of edge than for the other type of edge, the toothed wheel (1) being mounted on the camshaft so that a main face (11A, 11B) is oriented toward the camshaft position sensor (2), the main face oriented toward the position sensor being chosen so that:

if the engine has three or six cylinders, the six edges (15) spaced 60° apart are edges of the type for which the detection performance of the sensor is greater, and if the engine has four cylinders, the four edges (14) spaced 90° apart are edges of the type for which the detection performance of the sensor is greater.

20. A method for assembling an internal combustion engine (M), comprising a camshaft, a toothed wheel as claimed in claim 1, and a camshaft position sensor (2) of the type capable of detecting a high or low level of the toothed wheel and of detecting a tooth edge from a variation in level, the sensor having a greater detection performance for one type of edge than for the other type of edge, the assembly method comprising mounting the toothed wheel (1) on the camshaft so that a main face (11A, 11B) of the toothed wheel is oriented toward the camshaft position sensor, in which, if the engine has three or six cylinders, the main face oriented toward the position sensor is chosen so that the six edges (15) spaced 60° apart are of the type for which the sensor has the best detection performance, and if the engine has four cylinders, the main face oriented toward the position sensor is the opposite face, so that the four edges (14) spaced 90° apart are of the type for which the sensor has the best detection performance.

\* \* \* \* \*